United States Patent [19]

Fukushima et al.

[11] Patent Number: 5,284,120
[45] Date of Patent: Feb. 8, 1994

[54] FUEL CONSUMPTION MEASURING DEVICE

[75] Inventors: Susumu Fukushima; Yukimitsu Omori, both of Yokohama, Japan

[73] Assignee: Ono Sokki Co., Ltd., Japan

[21] Appl. No.: 977,152

[22] Filed: Nov. 16, 1992

[30] Foreign Application Priority Data

Apr. 13, 1992 [JP] Japan .................. 4-119730

[51] Int. Cl.$^5$ .......................... G01L 3/26
[52] U.S. Cl. .................. 123/510; 123/497; 73/113
[58] Field of Search ............ 123/510, 514, 456, 497, 123/462, 447, 511; 73/113, 114, 117.3

[56] References Cited

U.S. PATENT DOCUMENTS

| | | | |
|---|---|---|---|
| 3,695,097 | 10/1972 | Michalowicz | 73/113 |
| 4,061,024 | 12/1977 | Erwin, Jr. | 73/114 |
| 4,092,850 | 6/1978 | Erwin, Jr. | 73/113 |
| 4,205,648 | 6/1980 | Graham | 123/497 |
| 4,479,465 | 10/1984 | Flynn | 123/514 |
| 4,498,334 | 2/1985 | Riesenberg | 73/113 |
| 4,539,965 | 9/1985 | Soltau | 123/514 |
| 4,612,804 | 9/1986 | Colonnello | 73/113 |
| 4,625,696 | 12/1986 | Radaelli | 123/514 |
| 4,745,800 | 5/1988 | Henning | 73/114 |

Primary Examiner—E. Rollins Cross
Assistant Examiner—Thomas Moulis
Attorney, Agent, or Firm—Lorusso & Loud

[57] ABSTRACT

A fuel consumption measuring device is provided with a flow meter which is mounted on a fuel feeding passage extending from a fuel tank to an engine, wherein a return fuel which is not consumed by the engine is returned to a passage in the downstream of the flow meter through a return passage so as to measure a fuel consumption in the engine by the flow meter. The fuel feeding passage is provided with a pressure reducing valve for maintaining a confluence of the fuel feeding passage and the return passage at atmospheric pressure. Therefore, the fuel consumption measuring device has high measuring accuracy and high security, and is suitable for a vehicle.

4 Claims, 5 Drawing Sheets

FIG. I

FUEL CONSUMPTION MEASURING DEVICE

BACKGROUND OF THE INVENTION

1. Field of the Invention

This invention relates to a fuel consumption measuring device used for measuring a fuel consumption of an engine and, more particularly, to a fuel consumption measuring device suitable for an engine having a return fuel, such as an electronic fuel injection gasoline engine or a diesel engine.

2. Description of the Prior Art

FIG. 5 is a system diagram showing one embodiment of a conventional fuel consumption measuring device.

In a conventional fuel consumption measuring device 50, fuel is pumped out of a fuel tank 61 by a pump 62, and has a predetermined pressure which is set by a relief valve 51. Further, the relief valve 51 is connected to a flow meter 53 through a filter 52 or the like.

The flow meter 53 may be provided with opposing four pistons and cylinders, and crankshafts. The fuel is fed through an intermediate portion on which crankshafts are mounted, and is exhausted after passing through four circumferential ports. At this time, these four pistons serve as a three way valve with respect to the adjacent pistons in a counterclockwise manner. The respective pistons are alternately operated to fill the respective cylinders with the fuel, and to exhaust the fuel out of the cylinders. The piston is reciprocated to rotate the crankshaft which is provided with a permanent magnet. Accordingly, a rotation detector magnetically coupled with the crankshaft can be driven to fetch a pulse signal corresponding to a flow rate.

The fuel having passed through the flow meter 53 is once accumulated in a return processing tank 54, and is supplied by a pump 63 to injectors 64. The fuel is then injected to an inlet manifold portion of an engine (not shown).

Fuel injection quantity is determined by a valve opening time of the injector 64 and a differential pressure between pressure of a fuel line (fuel feeding passage) and pressure of the inlet manifold. Therefore, it is necessary to always hold a constant differential pressure between the pressure of the fuel line and the pressure of the inlet manifold.

Hence, a primary pressure regulator 65 is operated to return excess fuel through a return pipe into the return processing tank 54 so as to hold a constant pressure in the fuel feeding passage.

The return processing tank 54 is a device used for processing a return fuel, and is communicated with atmosphere to be held at atmospheric pressure.

The return processing tank 54 is provided with a float valve 55 which controls to maintain a constant liquid level. In the float valve 55, when the liquid level is lowered to lower the float, a needle of the valve is lowered to cause inflow of the fuel.

Thus, it is possible to constantly supply the same quantity of the fuel as that of the fuel consumed by an actual injection of the injectors 65 to the return processing tank 54. Since the flow meter 54 is operated to measure the quantity of the supplied fuel, the fuel consumption in the injectors 65 can be measured.

A heat exchanger 56 is provided to cool the fuel returned into the return processing tank 54 by using the fuel in the fuel tank 61 when the temperature of the returned fuel is increased.

The conventional fuel consumption measuring device as described above is operated to measure the fuel consumption based on the inflow rate of the fuel into the return processing tank 54 while controlling to maintain the constant liquid level by the float valve 55. Consequently, since the liquid level position is varied when vibration is generated or when the flow rate is varied, it is impossible to measure the fuel consumption accurately, in particular, during measuring in the transient state. Further, the conventional fuel consumption measuring device can not be used as a vehicle equipment because it is too sensitive to the vibration as described hereinbefore.

In addition, a pipe is in the opened condition since the return processing tank 54 should be opened to atmosphere. Accordingly, there is a problem of a low security of the return processing tank 54.

SUMMARY OF THE INVENTION

It is an object of the present invention to provide a fuel consumption measuring device which can solve the problems as described above, has a high measuring accuracy and a high security, and is suitable for a vehicle.

In order to solve the problems set forth hereinbefore, in a fuel consumption measuring device including a flow meter which is mounted on a fuel feeding passage extending from a fuel tank to an engine, wherein a return fuel which is not consumed by the engine is returned through a return passage to a passage in the downstream of the flow meter, and a quantity of the fuel consumed in the engine is measured by the flow meter, a fuel consumption measuring device of the present invention is characterized by providing a pressure reducing valve mounted on the fuel feeding passage to maintain a confluence between the fuel feeding passage and the return passage at atmospheric pressure.

Alternatively, in a fuel consumption measuring device including a flow meter which is mounted on a fuel feeding passage extending from a fuel tank to an engine, wherein a return fuel which is not consumed by the engine is returned through a return passage to a passage in the downstream of the flow meter, and a quantity of the fuel consumed in the engine is measured by the flow meter, a fuel consumption measuring device of the present invention comprises a pressure detecting means for detecting a pressure of a confluence between the fuel feeding passage and the return passage, flow regulating means for regulating a flow rate of the fuel feeding passage, and control means for controlling the flow regulating means so as to maintain the confluence between the fuel feeding passage and the return passage at atmospheric pressure depending upon a detected result of the pressure detecting means.

In the latter case, the flow regulating means is characterized by being composed of a flow regulating valve or flow regulating pumps. Further, the flow regulating pump is characterized by serving as the flow meter.

According to the present invention, it is possible to maintain the confluence between the fuel feeding passage and a return passage at atmospheric pressure by the pressure reducing valve or the pressure detecting means and the flow regulating means.

As described in detail hereinbefore, it is unnecessary to control the liquid level so that the liquid level position is not varied according to the flow rate. As a result, it is possible to measure the fuel consumption accurately.

Since all the pipes can be in the closed condition, it is possible to avoid, for example, leakage of the fuel and provide high security.

BRIEF DESCRIPTION OF THE DRAWINGS

The foregoing and other objects and features of the invention will become apparent from the following description of preferred embodiments of the invention with reference to the accompanying drawings, in which.

DESCRIPTION OF THE PREFERRED EMBODIMENTS

Figure 1:
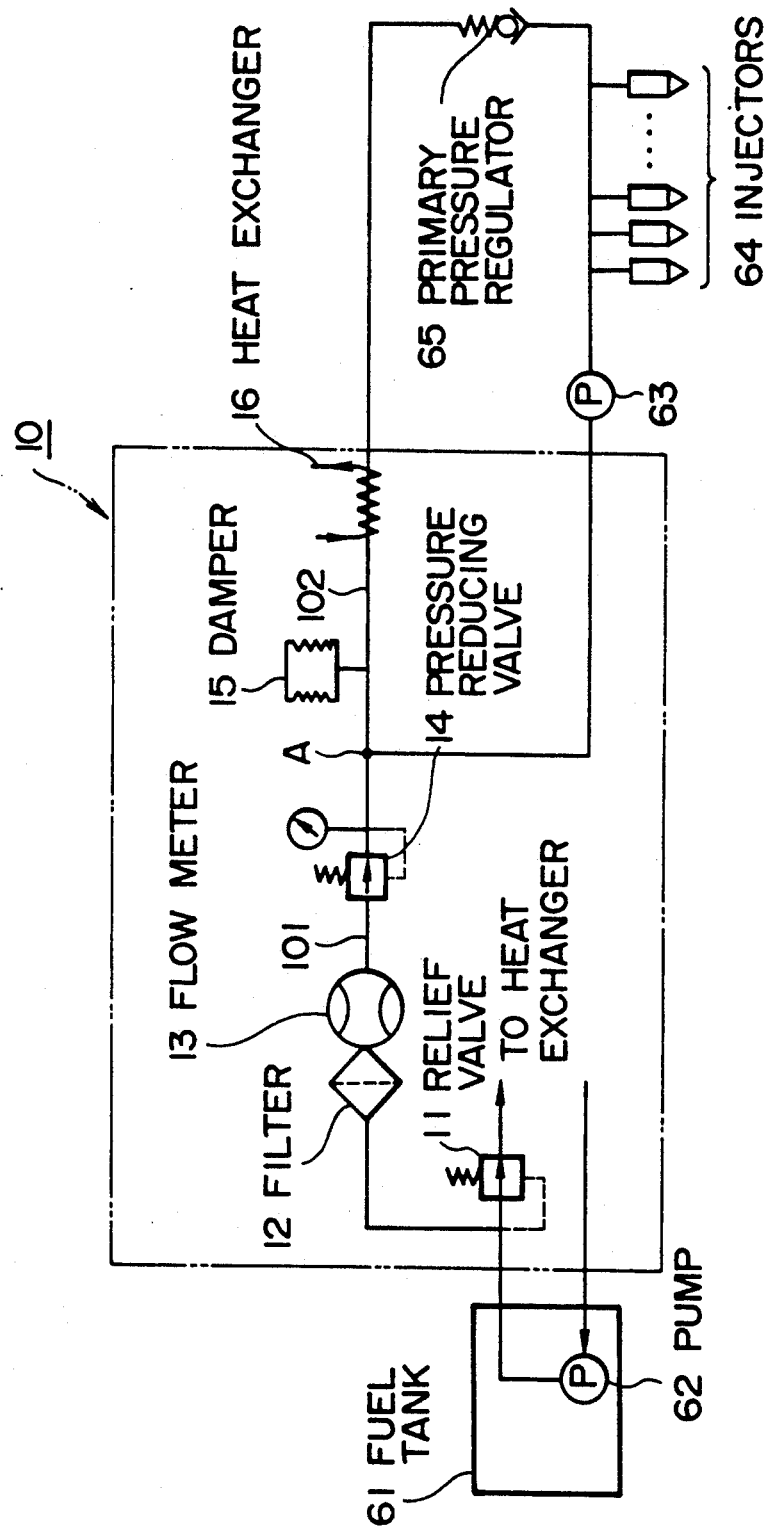
FIG. 1 is a system diagram showing a first embodiment of a fuel consumption measuring device of the present invention.

FIG. 1 is a system diagram showing a first embodiment of a fuel consumption measuring device of the present invention.

In the respective embodiments set forth hereinafter, the same numerals are used for the functional structure identical to that shown in the above conventional structure and in other embodiments, and description of similar structure is omitted.

In a fuel consumption measuring device 10 of the first embodiment, as in the case of the conventional device, fuel is pumped out of a fuel tank 61 by a pump 62, and has a predetermined pressure which is set by a relief valve 11. Further, the relief valve 11 is connected to a flow meter 13 through a filter 12 or the like.

In the embodiment, a fuel feeding passage 101 is provided in the downstream of the flow meter 13. In addition, a pressure reducing valve 14 is provided to maintain a confluence A between the fuel feeding passage 101 and a return passage 102 at atmospheric pressure.

As noted above, the confluence A is maintained at atmospheric pressure by the pressure reducing valve 14. Therefore, when returning the fuel which is not used by the injectors 64 to the confluence A through a primary pressure regulator 65, the pressure reducing valve 14 is opened and closed to supply the fuel through the flow meter 13 by the quantity of the fuel injected by the injectors 64. As a result, the confluence A can be maintained at atmospheric pressure.

Accordingly, the quantity of the fuel passing through the flow meter 13 corresponds to the quantity of the fuel actually injected by the injectors 64.

The return fuel which is not injected by the injectors 64 is always less than the supplied fuel. Thus, a space such as a return processing tank 54 is not required unlike the conventional device. However, it is necessary to absorb the fuel while maintaining the pressure when the quantity of the fuel is suddenly increased. Therefore, the fuel consumption measuring device 10 is provided with a damper 15 comprising an expansion container such as bellows in the vicinity of the confluence A.

The return fuel is cooled by the fuel in the fuel tank 61 when passing through a heat exchanger 16.

In the first embodiment, a mechanical type of fuel consumption measuring device employing the pressure reducing valve 14 is provided so that there are advantages of high reliability and fabrication at lower cost of the fuel consumption measuring device.

Figure 2:
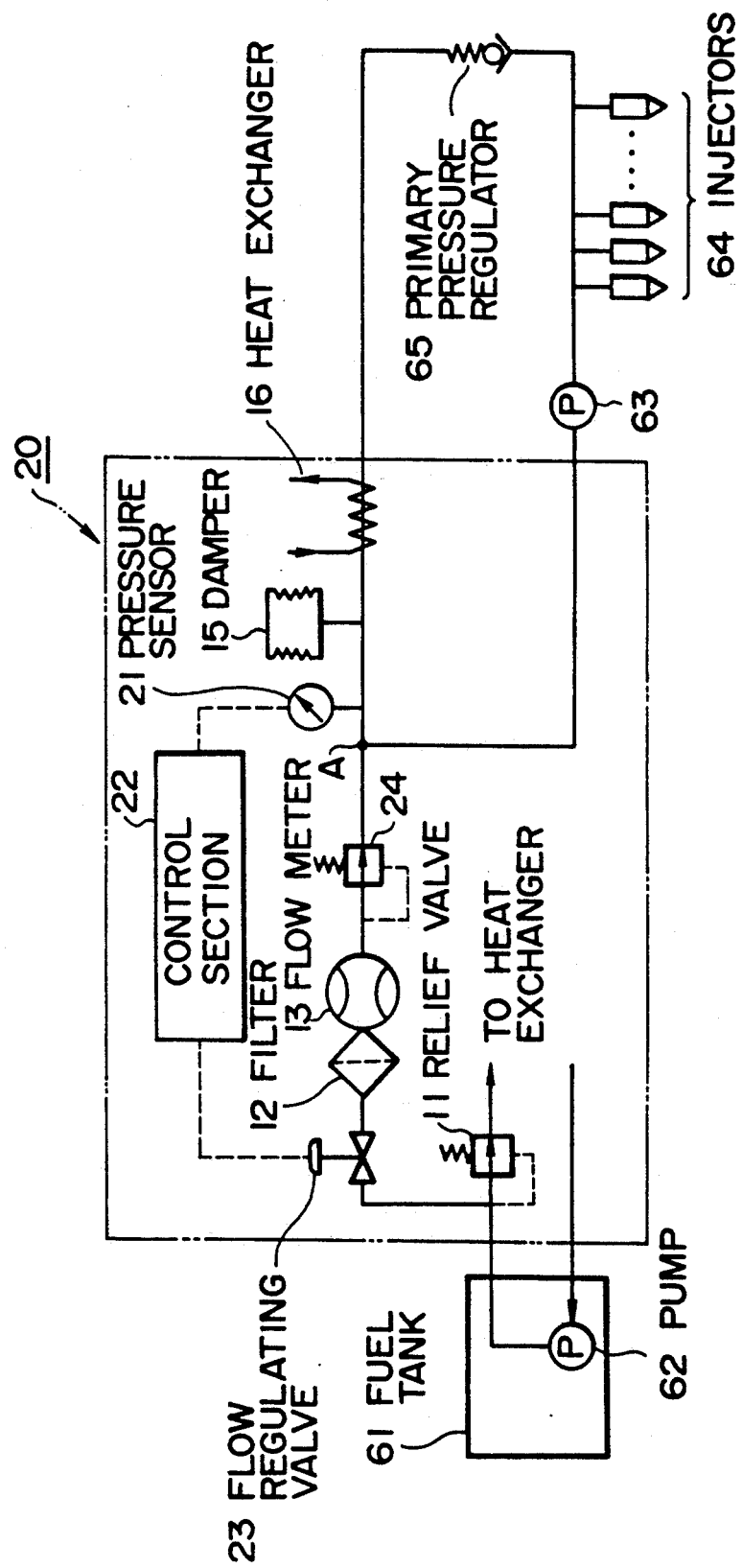
FIG. 2 is a system diagram showing a second embodiment of the fuel consumption measuring device of the present invention.

FIG. 2 is a system diagram showing a second embodiment of the fuel consumption measuring device of the present invention.

In the second embodiment, a fuel consumption measuring device 20 is provided with a pressure sensor 21 in the vicinity of the confluence A. Further, a control section 22 is operated to regulate an opening of a flow regulation valve 23 mounted on the fuel feeding passage in the upstream of the flow meter 13, so that the confluence A is maintained at atmosphere pressure.

Figure 3:
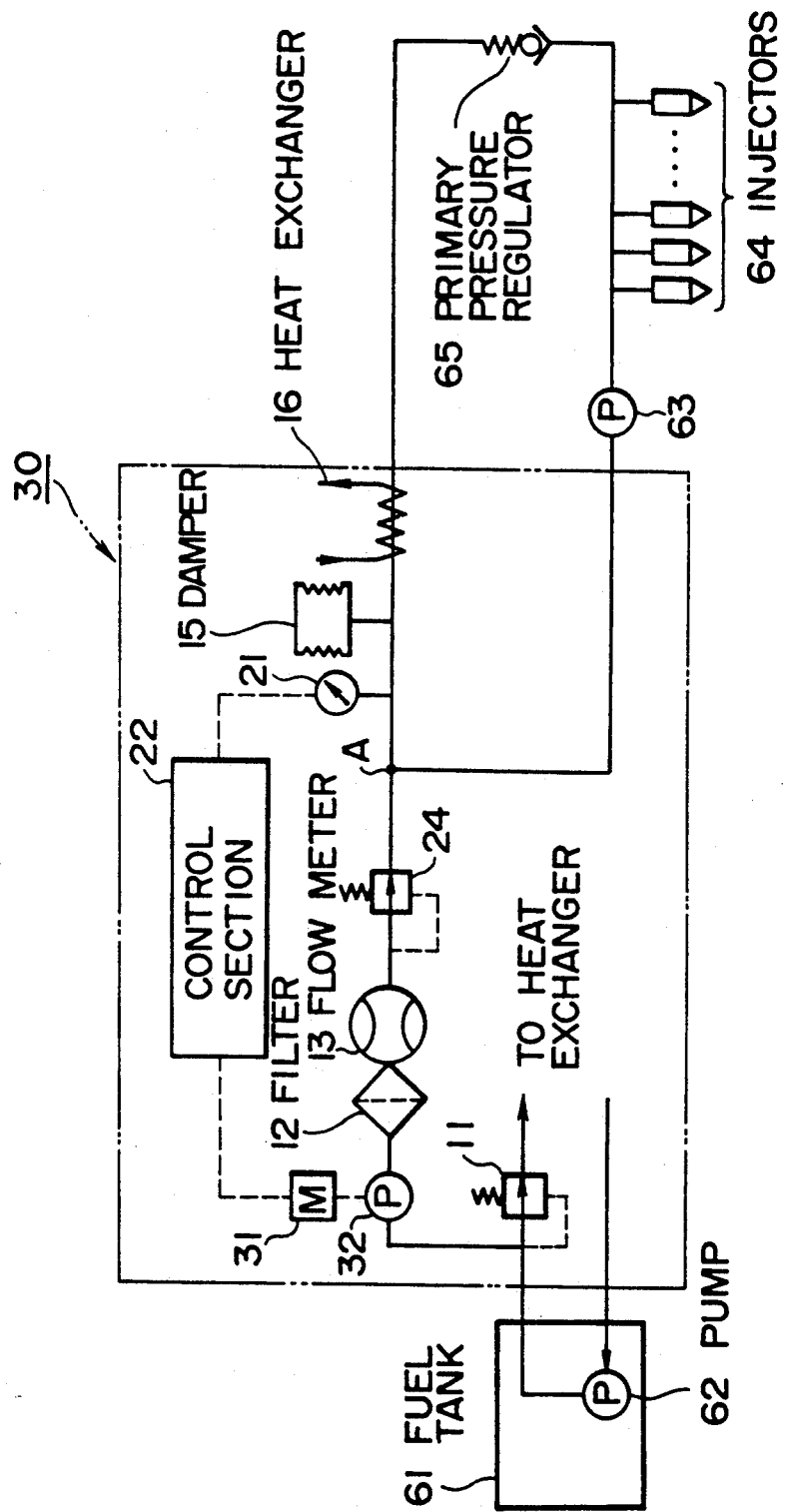
FIG. 3 is a system diagram showing a third embodiment of the fuel consumption measuring device of the present invention.

FIG. 3 is a system diagram showing a third embodiment of the fuel consumption measuring device of the present invention.

In the third embodiment, a fuel consumption measuring device 30 is provided with the pressure sensor 21 in the vicinity of the confluence A. Further, the control section 22 is operated to actuate a motor 31 so as to rotate a flow regulating pump 32 mounted on the fuel feeding passage in the upstream of the flow meter 13. As a result, the confluence A is maintained at atmospheric pressure.

In the second and third embodiments, the fuel consumption measuring device is electronically controlled by the control section 22 so as to have a superior response and high accuracy.

Figure 4:
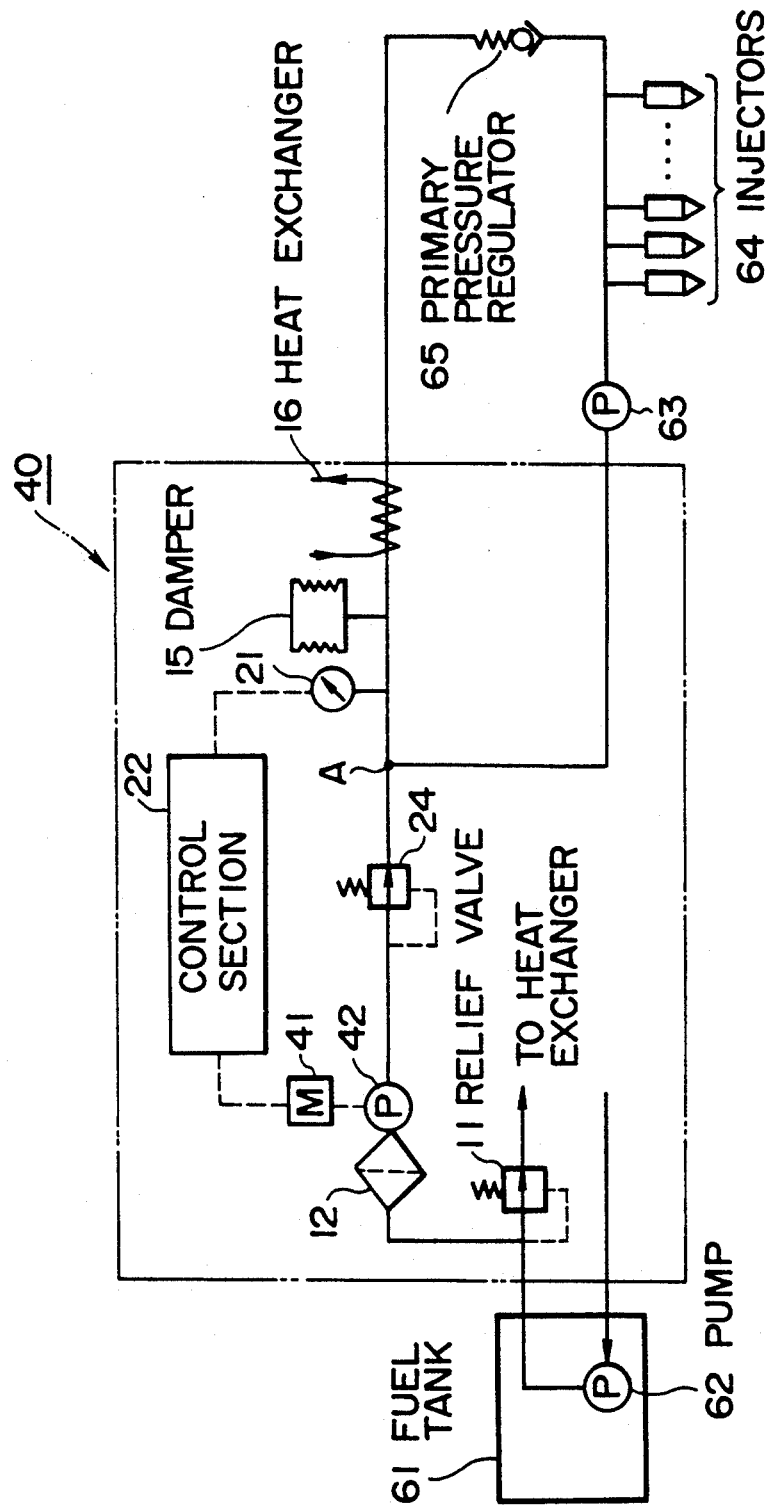
FIG. 4 is a system diagram showing a fourth embodiment of the fuel consumption measuring device of the present invention.
Figure 5:
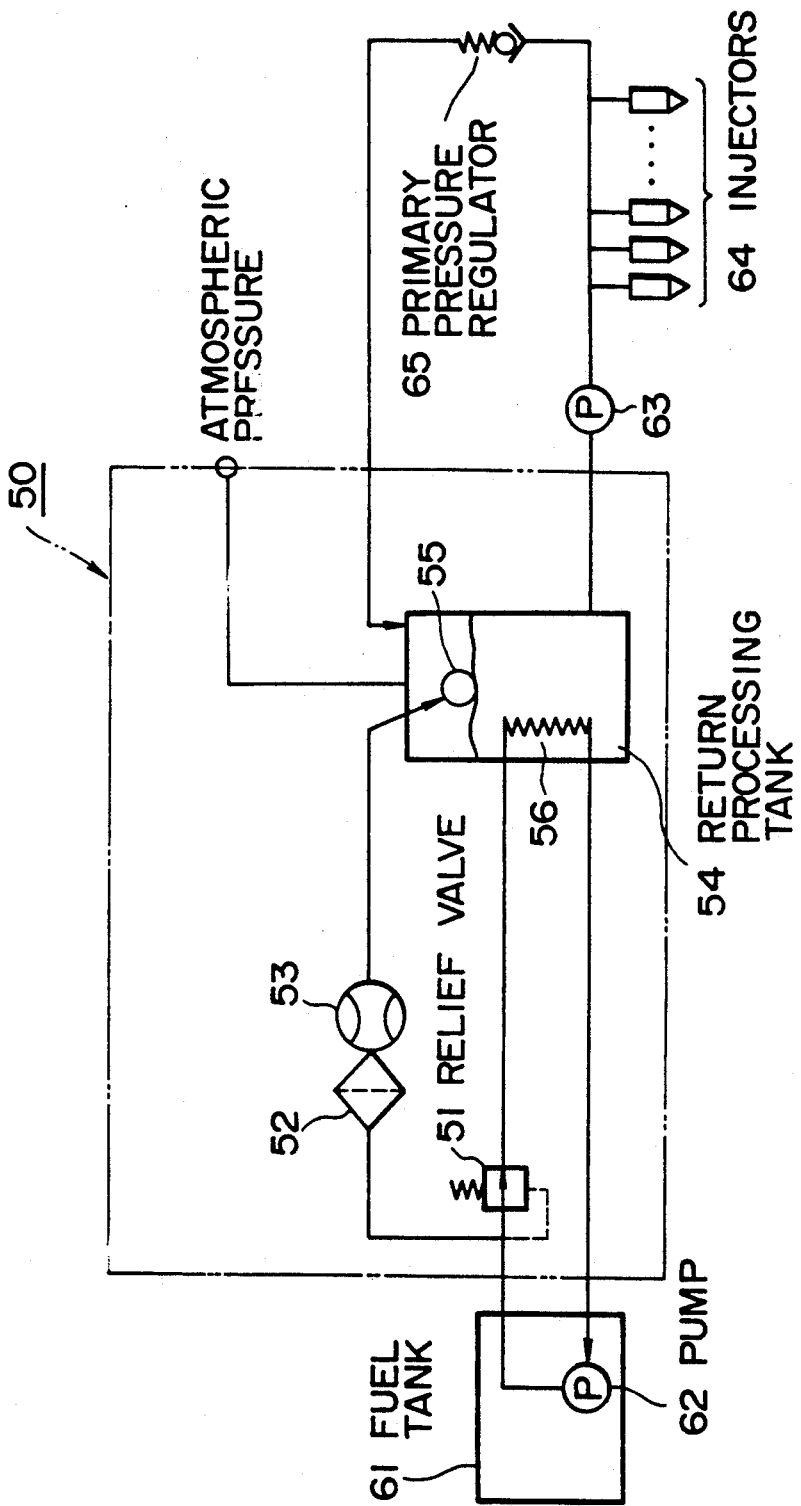
FIG. 5 is a system diagram showing a prior art fuel consumption measuring device.

FIG. 4 is a system diagram showing a fourth embodiment of the fuel consumption measuring device of the present invention.

In the fourth embodiment, a fuel consumption measuring device 40 is provided with the pressure sensor 21 in the vicinity of the confluence A. Further, the control section 22 is operated to actuate a motor 41 so as to rotate a flow measuring and regulating pump (measuring pump) 42 mounted on the fuel feeding passage. As a result, the confluence A is maintained at atmospheric pressure.

In the embodiment, the fuel consumption measuring device 40 is not provided with the flow meter 13, and a discharge quantity of the flow regulating pump 42 is detected and is defined as a fuel consumption.

According to the fourth embodiment, the flow regulating pump 42 also serves as the flow meter 13 in the first to third embodiments. Consequently, the construction of the fuel consumption measuring device can be simplified.

It is noted that the present invention should not be limited to the embodiments set forth hereinbefore, and various modifications may be made.

For example, the pump 62 in the fuel tank 61 may be omitted in case the flow regulating pumps 32, 42 are provided as shown in the third and fourth embodiments.

In the third embodiment, the motor 31 and the flow regulating pump 32 may be omitted and the pump 62 may be directly rotated by the control section 22.

In the first embodiment to the fourth embodiments, though a description has been given of the case where the heat exchanger 16 performs heat exchange by using the fuel in the fuel tank 61, another heat exchange means without using the fuel may be employed.

Further, if the flow meter 13 and the pump 32 have, for example, a diaphragm, the primary pressure regulator 24 may be omitted.

What is claimed is:

1. In a fuel consumption measuring device having a flow meter which is mounted on a fuel feeding passage extending from a fuel tank to an engine, wherein return fuel which is not consumed by said engine is returned through a return passage to a passage downstream of said flow meter, and a quantity of the fuel consumed in said engine is measured by said flow meter, said fuel consumption measuring device comprising:
a pressure reducing valve mounted on said fuel feeding passage to maintain a confluence between said fuel feeding passage and said return passage at atmospheric pressure.

2. In a fuel consumption measuring device having a flow meter which is mounted on a fuel feeding passage extending from a fuel tank to an engine, wherein return fuel which is not consumed by said engine is returned through a return passage to a passage downstream of said flow meter, and a quantity of the fuel consumed in said engine is measured by said flow meter, said fuel consumption measuring device comprising:
pressure detecting means for detecting a pressure of a confluence between said fuel feeding passage and said return passage;
flow regulating means for regulating a flow rate of said fuel feeding passage; and
control means for controlling said flow regulating means so as to maintain said confluence between said fuel feeding passage and said return passage at atmospheric pressure depending upon a detected result of said pressure detecting means.

3. A fuel consumption measuring device according to claim 2, wherein said flow regulating means is a flow regulating valve or a flow regulating pump.

4. A fuel consumption measuring device according to claim 3, wherein said flow regulating pump also serves as said flow meter.

* * * * *